United States Patent
Hill, IV (10) Patent No.: US 12,344,402 B1
(45) Date of Patent: Jul. 1, 2025

(54) ANGULARLY ADJUSTABLE SUPPORT TOOL INDEXES AND RELATED METHODS

(71) Applicant: The Boeing Company, Arlington, VA (US)

(72) Inventor: Chester J. Hill, IV, Grafton, IL (US)

(73) Assignee: The Boeing Company, Arlington, WA (US)

( * ) Notice: Subject to any disclaimer, the term of this patent is extended or adjusted under 35 U.S.C. 154(b) by 0 days.

(21) Appl. No.: 18/671,163

(22) Filed: May 22, 2024

(51) Int. Cl.
*B64F 5/10* (2017.01)
*B23P 19/12* (2006.01)

(52) U.S. Cl.
CPC .............. *B64F 5/10* (2017.01); *B23P 19/12* (2013.01); *Y10T 29/49778* (2015.01)

(58) Field of Classification Search
CPC .... B64F 5/10; B64F 5/00; B23P 19/12; B23P 19/10; B23P 19/00; Y10T 29/49778; Y10T 29/49764; Y10T 29/49; Y10T 29/00
See application file for complete search history.

(56) References Cited

U.S. PATENT DOCUMENTS

| | | | |
|---|---|---|---|
| 5,604,974 A * | 2/1997 | Roberts ................. | B23Q 15/24 29/702 |
| 9,587,670 B2 * | 3/2017 | Matignon ................ | B64F 5/10 |
| 9,962,834 B2 * | 5/2018 | Stone .................... | B25J 15/0028 |
| 10,144,530 B1 | 12/2018 | Erion et al. | |
| 10,611,030 B2 * | 4/2020 | Stone ........................ | B64F 5/50 |
| 10,633,076 B2 * | 4/2020 | Bishop ...................... | B64C 3/56 |
| 11,840,347 B2 * | 12/2023 | Colmagro .............. | F16C 23/045 |
| 2013/0302083 A1 * | 11/2013 | Matignon ................ | B64F 5/50 403/52 |
| 2016/0368144 A1 * | 12/2016 | Stone .................... | B25J 15/0616 |
| 2017/0355440 A1 * | 12/2017 | Bishop ...................... | B64F 5/10 |
| 2021/0269167 A1 * | 9/2021 | Colmagro .............. | B64D 27/40 |
| 2023/0242277 A1 * | 8/2023 | Bernadet ............... | B25B 27/062 29/525.02 |

* cited by examiner

*Primary Examiner* — Lawrence Averick
(74) *Attorney, Agent, or Firm* — Kolitch Romano Dascenzo Gates LLC (57) ABSTRACT

An angularly adjustable support tool index for aligning a tool relative to a hole of a part includes an index component having an indexing face positioned against the part. A trapped ball and socket joint allows pivotal adjustment of the index component with respect to a support fixture, which is configured to adjust the index component to align with and support the part. A bushing couples the index component to the ball and socket joint, and a retaining lock secures the bushing in place with respect to the support fixture. The retaining lock restricts or prevents movement the ball and socket joint from movement and maintains a set position of the index component when the retaining lock is engaged with a shoulder of the bushing, and allows adjustment of the index component with respect to the support fixture when the retaining lock is selectively translated away from the bushing shoulder.

18 Claims, 8 Drawing Sheets

FIG. 8 ns and Related Methods

ANGULARLY ADJUSTABLE SUPPORT TOOL INDEXES AND RELATED METHODS

FIELD

The present disclosure relates generally to angularly adjustable support tool indexes and more particularly to the same for aligning a tool relative to a hole of a part.

BACKGROUND

Complex manufacturing projects such as the design and manufacture of aircraft typically require the successful integration of hundreds of thousands of parts and associated processes according to a comprehensive plan to produce an aircraft in accordance with engineering design data. Such processes may include the automated manufacturing of a number of components, assemblies and/or sub-assemblies via computer-aided design (CAD) systems, with tolerance ranges assigned based on fit and function of the component part features. This process of manufacturing parts having a prescribed tolerance range typically results in gaps during assembly, often ultimately requiring the use of shims to accommodate the gaps.

After manufacturing component parts, conventional manufacturing techniques are used for assembling component parts to produce assemblies, some of which may be sub-assemblies for even larger assemblies. Traditionally, this process has relied on fixtured tooling techniques that force component parts into certain positions and temporarily fastens them together to locate the parts relative to pre-defined engineering requirements. For component parts joined and secured together by fasteners, the assembly process often involves pre-drilled pilot holes in one or more of the joined parts that must be aligned with the other parts to be secured or joined together. For example, in full-size determinant assembly techniques, holes are drilled in parts during component fabrication, before assembly. At assembly, the pre-drilled holes are then aligned, allowing the delivery of components that are ready to be assembled as-delivered, without requiring further prep upon arrival at assembly. This can allow for improved build time and optimized build sequencing by manufacturing structures and subsystems in parallel.

However, when component parts and fasteners are not fitting together as expected, or when pre-drilled holes are not lining up as expected, it can be difficult to determine the source of the misalignment. It is also difficult to proactively determine the quality of delivered parts or products without expensive, invasive techniques and specialized personnel to complete the work. There is currently no way to measure angular variation of adjusted parts or physical tooling items without the use of theodolites or laser trackers, which are costly to use and require specialized, non-production personnel to operate them, and thus, can delay production. There thus remains a need for determining the quality of a product without the need for expensive and/or invasive techniques and specialized personnel to complete the work. There also remains a need for a means to laser track the angularity of the tooling index relative to the defined coordinate system of the entire assembly tool that is not subject to the above limitations.

SUMMARY

Presently disclosed angularly adjustable support tool indexes may be configured to create a passively adjustable axis tooling index that can be locked in place resultant of allowed variation within an assembly, such as for full-size determinant assembly techniques. In some examples, disclosed angularly adjustable support tool indexes create a size-minimized and simplified means of providing multi-axis tool indexing and support. Manufacturing variation in holes in parts may require slight angular adjustment of the parts to be supported relative to other mating parts in order to enable determinant assembly of multiple parts without binding when installing fasteners through pre-drilled holes in the mating parts. Such angular adjustment and support may be provided by disclosed angularly adjustable support tool indexes.

In an example, an angularly adjustable support tool index for aligning a tool relative to a hole of a part may include an index component, a trapped ball and socket joint, a bushing, and a retaining lock. The index component may include an indexing face positioned against the part. The trapped ball and socket joint may be configured to allow pivotal adjustment of the index component with respect to a support fixture, and the support fixture may be configured to adjust the index component to align with and support the part. The bushing may couple the index component to the trapped ball and socket joint. The retaining lock may be configured to secure the bushing in place with respect to the support fixture and may be configured to lock the trapped ball and socket joint from movement and maintain a set position of the index component when the retaining lock is engaged with a shoulder of the bushing. Further, the retaining lock may be configured to be selectively translated away from the shoulder of the bushing to allow adjustment of the index component with respect to the support fixture.

Disclosed adjustable support systems may be configured to support at least one part of an assembly structure and may include a support fixture, an angularly adjustable support tool index, and an installation pin. The index component of the support tool index may be coupled to the support fixture via a bearing housing surrounding the trapped ball and socket joint of the support tool index. The installation pin may be disposed through a hole of the at least one part of the assembly structure and may be received within a through-hole extending through the index component, the trapped ball and socket joint, and the bushing of the support tool index. The adjustable support system may be configured to maintain support for the at least one part and further may be configured to provide a nominal position of the index component while enabling pivotal adjustment of the index component to compensate for potential misalignment of mating features of the assembly structure.

Disclosed methods may include securing an angularly adjustable support tool index to at least one part of an assembly structure, and moving the retaining lock away from the shoulder of the bushing, thereby allowing the trapped ball and socket joint to pivot with respect to the support fixture supporting the at least one part of the assembly structure.

The present disclosure also relates to measuring apparatuses for measuring an angularly adjustable indexing component, with disclosed support tool indexes being a non-exclusive example of angularly adjustable indexing components. In such measuring apparatuses, two gaugeable features are set to a fixed tool feature containing a spherical bearing or other trapped ball and socket joint that provides two-dimensional axial adjustment of an attached tool index to the allowed as-assembled location of the part. These gaugeable features may be configured to establish the baseline index for a dial indicator to be used to calculate the resultant angle of the associated part feature. In this manner, measuring devices can be configured to provide a real-time understanding of the precision within an assembly, thereby allowing for preemptive warning of non-conforming parts being used for assembly, an understanding of the determinant assembly process, and a tangible measurement for documenting nonconformances as well as bolstering final assembly quality.

In an example, a measuring apparatus includes a support fixture having a datum flange and at least one displacement indicator. The indexing surface of an angularly adjustable indexing component may be axially adjustable relative to the datum flange, and the datum flange may include at least a first hole and second hole extending therethrough. A portion of the at least one displacement indicator may be configured to be positioned to extend through the first hole of the datum flange such that the at least one displacement indicator is at least substantially parallel to a nominal centerline of the indexing surface, and such that the at least one displacement indicator is configured to engage a surface (e.g., of a part) that is clamped against the indexing surface when the displacement indicator extends through the first hole in the datum flange. In this manner, the at least one displacement indicator may be configured to measure a first pivotal displacement of the surface relative to a nominal position, or orientation, of the surface.

The portion of the at least one displacement indicator may be further configured to be positioned to extend through the second hole of the datum flange such that the at least one displacement indicator is at least substantially parallel to the nominal centerline of the indexing surface, with the at least one displacement indicator being configured to engage the surface that is clamped against the indexing surface when the displacement indicator extends through the second hole in the datum flange, such that the at least one displacement indicator may be configured to measure a second pivotal displacement of the surface relative to the nominal position of the surface. The measured first and second pivotal displacements may enable determination of an axial orientation of the indexing surface relative to the nominal position of the part surface or other surface.

Disclosed systems may include such a measuring apparatus and the angularly adjustable indexing component. The angularly adjustable indexing component may be configured to move in at least two axes and/or may have at least two degrees of freedom, and may be configured to align a tool relative to a hole of the part.

Disclosed methods may include inserting part of a displacement indicator through a first hole in a datum flange of a support fixture supporting a part clamped to an indexing surface of an angularly adjustable indexing component such that the displacement indicator contacts the part, and measuring a first pivotal displacement of the part relative to a nominal position of the part, using the displacement indicator. Methods then may include inserting part of the displacement indicator through a second hole in the datum flange such that the displacement indicator contacts the part again, and measuring a second displacement of the part relative to the nominal position of the part, using the displacement indicator. The first hole and the second hole may be at least substantially equidistant from a longitudinal axis of an installation pin clamping the part to the angularly adjustable indexing component, and the first hole and the second hole may be positioned at 90 degrees relative to one another. Finally, a resultant angle that the part is off from the nominal position may be determined, using the measured first displacement and second displacement.

DESCRIPTION

FIGS. 1-3 and 5-6 provide illustrative, non-exclusive examples of support tool indexes and measuring apparatuses according to the present disclosure. Elements that serve a similar, or at least substantially similar, purpose are labeled with like numbers in each of FIGS. 1-3 and 5-6, and these elements may not be discussed in detail herein with reference to each of FIGS. 1-3 and 5-6. Similarly, all elements may not be labeled in each of FIGS. 1-3 and 5-6, but reference numerals associated therewith may be utilized herein for consistency. Elements, components, and/or features that are discussed herein with reference to one or more of FIGS. 1-3 and 5-6 may be included in and/or utilized with any of FIGS. 1-3 and 5-6 without departing from the scope of the present disclosure.

In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure. The examples of FIGS. 1-3 and 5-6 are non-exclusive and do not limit support tool indexes and measuring apparatuses to the illustrated examples of FIGS. 1-3 and 5-6. That is, support tool indexes and measuring apparatuses are not limited to the specific examples illustrated in FIGS. 1-3 and 5-6 and may incorporate any number of the various aspects, configurations, characteristics, properties, etc. that are illustrated in and discussed with reference to the schematic representation of FIG. 4 and/or the examples of FIGS. 1-3 and 5-6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 1-3 and 5-6; however, it is within the scope of the present disclosure that the previously discussed features, variants, etc. may be utilized therewith.

Figure 1:
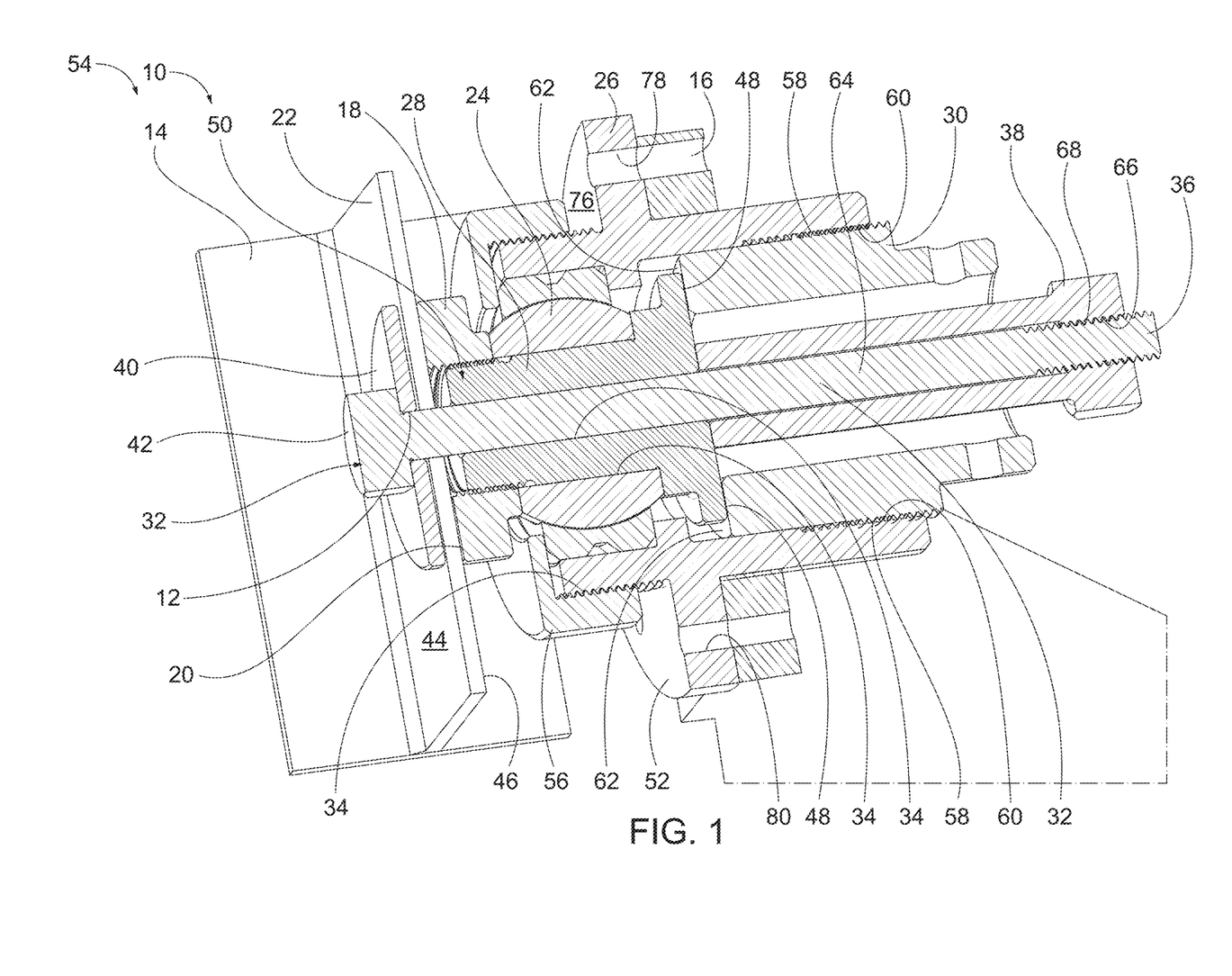
FIG. 1 is a cross-sectional view of an example of a support tool index according to the present disclosure, with the support tool index shown clamped to a part.
Figure 2:
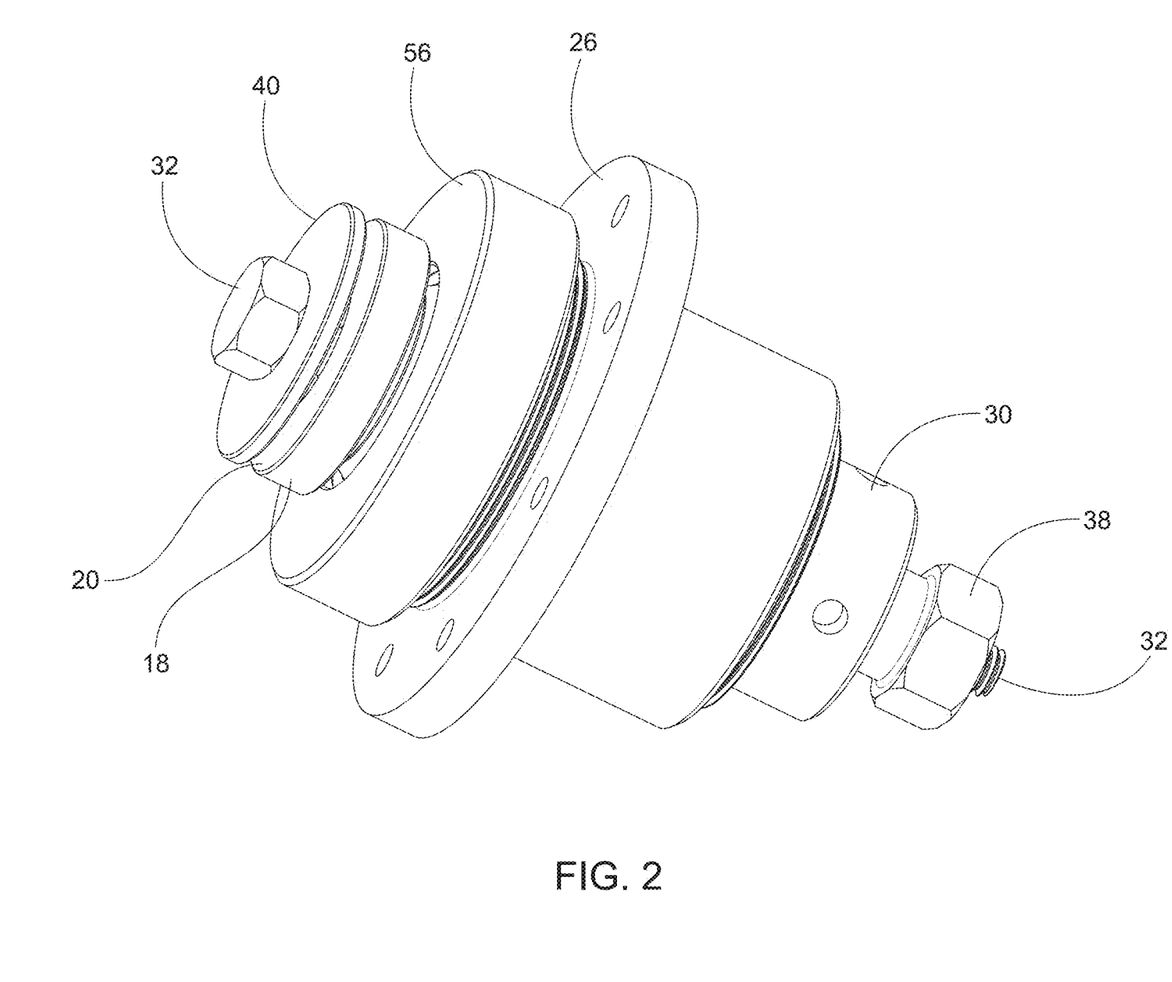
FIG. 2 is a perspective view of an example of a support tool index according to the present disclosure.

FIG. 1 shows a cutaway section view of an angularly adjustable support tool index 10 for aligning a tool 16 relative to a hole 12 of a part 14, and FIG. 2 shows a perspective view of an example of support tool index 10 illustrated apart from part 14. Support tool index 10 includes an index component 18 having an indexing face 20 positioned against (e.g., clamped against) part 14, though indexing face 20 may be clamped against other surfaces in other examples. Indexing face 20 is shown clamped against a flange 22 of part 14 in FIG. 1, though other arrangements also are within the scope of the present disclosure. In examples within the scope of the present disclosure, indexing face 20 may be clamped against a tool or other structure. As used herein, an indexing face may also be referred to as an indexing surface, and generally refers to a part-to-part interface or a part-to-tool interface. Support tool index 10 also includes a trapped ball and socket joint 24, which in some examples may be a spherical bearing. Ball and socket joint 24 is configured to allow pivotal adjustment and/or axial adjustment of index component 18 with respect to a support fixture 26. For example, ball and socket joint 24 may be configured to allow pivotal adjustment and/or axial adjustment of index component 18 at its centerline to maintain co-axial alignment between index component 18 and a centerline of hole 12 through part 14. Support fixture 26 is configured to adjust index component 18 to align with and support part 14.

Support tool index 10 further includes a bushing 28 coupling index component 18 to ball and socket joint 24, and a retaining lock 30 configured to secure bushing 28 in place with respect to support fixture 26. Retaining lock 30 is configured to lock ball and socket joint 24, or restrict or prevent movement of ball and socket joint 24, to thereby maintain a set position of index component 18 when retaining lock 30 is engaged with bushing 28 as shown in FIG. 1. Retaining lock 30 is configured to be selectively translated away from bushing 28 to allow adjustment of index component 18 with respect to support fixture 26.

In some examples, and as shown in FIGS. 1-2, index component 18 may be annular in shape, though other shapes of index component 18 also are within the scope of the present disclosure. For example, index component 18 may include any geometry or perimeter shape for an index component that includes an indexing face that extends around a center hole.

Support tool index 10 may be configured to receive an installation pin 32 through a through-hole 34 extending through index component 18, ball and socket joint 24, and bushing 28. Installation pin 32 also may be configured to extend through hole 12 in part 14 to secure part 14 against indexing face 20. An end 36 of installation pin 32 may be secured by a retainer 38 (e.g., a threaded retainer 38, such as a nut). Threaded retainer 38 may be configured to engage end 36 of installation pin 32 to lock, or clamp, part 14 in place against index component 18, while a shaft 64 of installation pin 32 extends through threaded retainer 38. For example, threads 66 of threaded retainer 38 may engage threads 68 adjacent end 36 of installation pin 32. Threaded retainer 38 may engage bushing 28 opposite index component 18. In some examples, a washer 40 may be positioned between a head 42 of installation pin 32 and a first side 44 of part 14, while indexing face 20 contacts, or is secured against (e.g. clamped against), a second side 46 of part 14. Installation pin 32 also may extend through a through-hole of washer 40 and/or through a through-hole of retainer 38.

Figure 3:
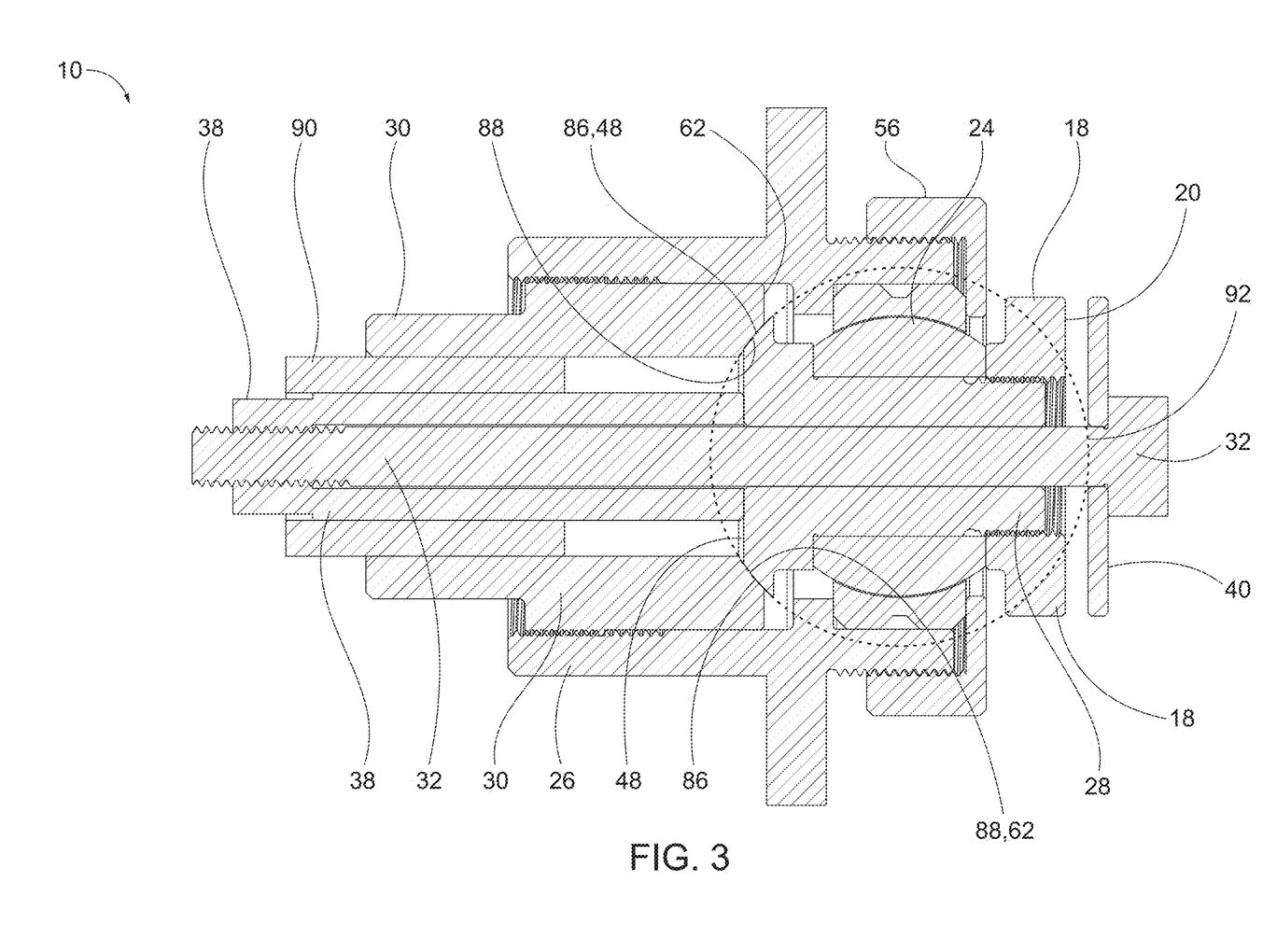
FIG. 3 is a cross-sectional view of another example of a support tool index according to the present disclosure.

Retaining lock 30 may be configured to engage a shoulder 48 of bushing 28. Shoulder 48 may face away from indexing face 20, as shown in FIG. 1. In some examples, index component 18 engages a first end 50 of bushing 28, with first end 50 being opposite from shoulder 48. First end 50 of bushing 28 may extend through index component 18, as shown in FIG. 1. Shoulder 48 may be substantially flat, straight, or square, or may be spherical and/or curved (e.g., may have a spherical face, such as is shown in FIG. 3). In examples with a spherical or curved shoulder 48, shoulder 48 may have a radial center concentric with the center of ball and socket joint 24. In examples where shoulder 48 is square, flat, or straight, shoulder 48 may be at least substantially parallel to indexing face 20 of index component 18, as shown in the example of FIG. 1.

Support tool index 10 generally may be configured to lock indexing face 20 in a nominal position, which, as used herein, means that indexing face 20 is held at least substantially parallel to a flange 52 of support fixture 26. Retaining lock 30 may be selectively translated within support fixture 26 and away from shoulder 48 of bushing 28 to create a gap between retaining lock 30 and shoulder 48. Such a gap allows index component 18 to freely pivot, via pivotal adjustment of ball and socket joint 24 with respect to support fixture 26, resulting in pivotal adjustment of indexing face 20 of index component 18. An outer surface 58 of retaining lock 30 may have a threaded engagement with an inner surface 60 of support fixture 26 to permit such selective translation of retaining lock 30 with respect to bushing 28 by threading retaining lock 30 towards or away from bushing 28. Retaining lock 30 may be translated back towards bushing 28 (e.g., by tightening retaining lock 30 via its threaded engagement with support fixture 26) until retaining lock 30 again engages, or contacts, shoulder 48 (e.g., via a shoulder-facing surface 62 of retaining lock 30) to force shoulder 48 to its nominal position. In forcing shoulder 48 to its nominal position, ball and socket joint 24 and index component 18 also are returned to their nominal positions and held there by retaining lock 30 pressing against shoulder 48 of bushing 28. In other words, shoulder-facing surface 62 of retaining lock 30 is engaged with shoulder 48 of bushing 28 when support tool index 10 is locked with respect to support fixture 26, and shoulder-facing surface 62 is spaced apart from shoulder 48 when support tool index is unlocked and ball and socket joint 24 is free to pivot with respect to support fixture 26. In some examples, support tool index 10 is also configured to lock indexing face 20 in a plurality of different pivotally adjusted positions, thereby holding indexing face 20 in a pivotally adjusted position until retaining lock 30 is moved away from bushing 28 to permit further movement of ball and socket joint 24 and index component 18 relative to support fixture 26.

Shoulder-facing surface 62 of retaining lock 30 may have a complementary curve to that of shoulder 48 of bushing 28 such that shoulder-facing surface 62 and shoulder 48 nest together when retaining lock 30 is engaged with bushing 28 to lock support tool index 10 in position with respect to support fixture 26. For example, if shoulder-facing surface 62 of retaining lock 30 is concave, then shoulder 48 of bushing 28 may be convex, and conversely, if shoulder-facing surface 62 of retaining lock 30 is convex, then shoulder 48 of bushing 28 may be concave. An example of this arrangement is shown in FIG. 3. Additionally or alternatively, shoulder 48 of bushing 28 may have a curved surface that shares a radial center point with that of ball and socket joint 24.

In some examples, bushing 28, ball and socket joint 24, and index component 18 are inseparable from one another without damaging or destroying support tool index 10. For example, bushing 28, ball and socket joint 24, and index component 18 may be integrally formed and/or monolithic, or they may be coupled together in such a way that they are inseparable without damaging or destroying support tool index 10. Because bushing 28, ball and socket joint 24, and index component 18 are inseparable, this results in these components moving together. In other words, when the ball of ball and socket joint 24 is pivoted within the socket of ball of and socket joint 24, this also causes corresponding movement of bushing 28 and index component 18 due to the way the ball of ball and socket joint 24 is coupled to and surrounds part of bushing 28, and due to the way index component 18 is coupled to bushing 28. Further, because index component 18 is clamped to a surface of part 14 (or other surface), the angle of the part (or angular displacement of the part relative to its nominal position) can then dictate the angle of indexing face 20, which in turn results in pivoting of ball and socket joint 24 and bushing 28 relative to support fixture 26.

Index component 18 of support tool index 10 may be coupled to support fixture 26 via a bearing housing 56 surrounding at least part of ball and socket joint 24 of support tool index 10. In some examples, bearing housing 56 is a bearing outer ring that is also coupled to support fixture 26. Bearing housing 56 may be configured to contain components of ball and socket joint 24 and keep debris away from the bearing. Installation pin 32 is disposed through a hole of at least one part of the assembly structure (e.g., through hole 12 of part 14), and is received through throughhole 34 extending through index component 18, ball and socket joint 24, and bushing 28 of support tool index 10.

FIG. 3 shows another example of support tool index 10 in which shoulder 48 of bushing 28 has a male spherical surface 86 (e.g., is convex) with a common origin with that of the ball of ball and socket joint 24, which is indicated by dashed circle 92. Shoulder-facing surface 62 of retaining lock 30 has a female spherical surface 88 (e.g., is concave) that engages with male spherical surface 86. When male spherical surface 86 is engaged with female spherical surface 88, together they form a friction brake. Due to male spherical surface 86 sharing the same origin as the ball of ball and socket joint 24, an additional bushing 90 may be included to aid in returning the tool index to its nominal orientation. For example, additional bushing 90 may be positioned between retaining lock 30 and retainer 38 of installation pin 32. The addition of additional bushing 90 may create a nominal orientation for indexing face 20 of index component 18. To pivot indexing face 20, additional bushing 90 may be removed and retaining lock 30 may be loosened to move retaining lock 30 away from bushing 28. When retaining lock 30 is spaced apart from shoulder 48 of bushing 28, indexing face 20 may be pivoted to any desired orientation, and then retaining lock 30 may be tightened to engage the friction brake between male spherical surface 86 and female spherical surface 88 to lock indexing face 20 and ball and socket joint 24 in the desired orientation. To return indexing face 20 to its nominal position, additional bushing 90 may be re-inserted as shown in FIG. 3.

Figure 4:
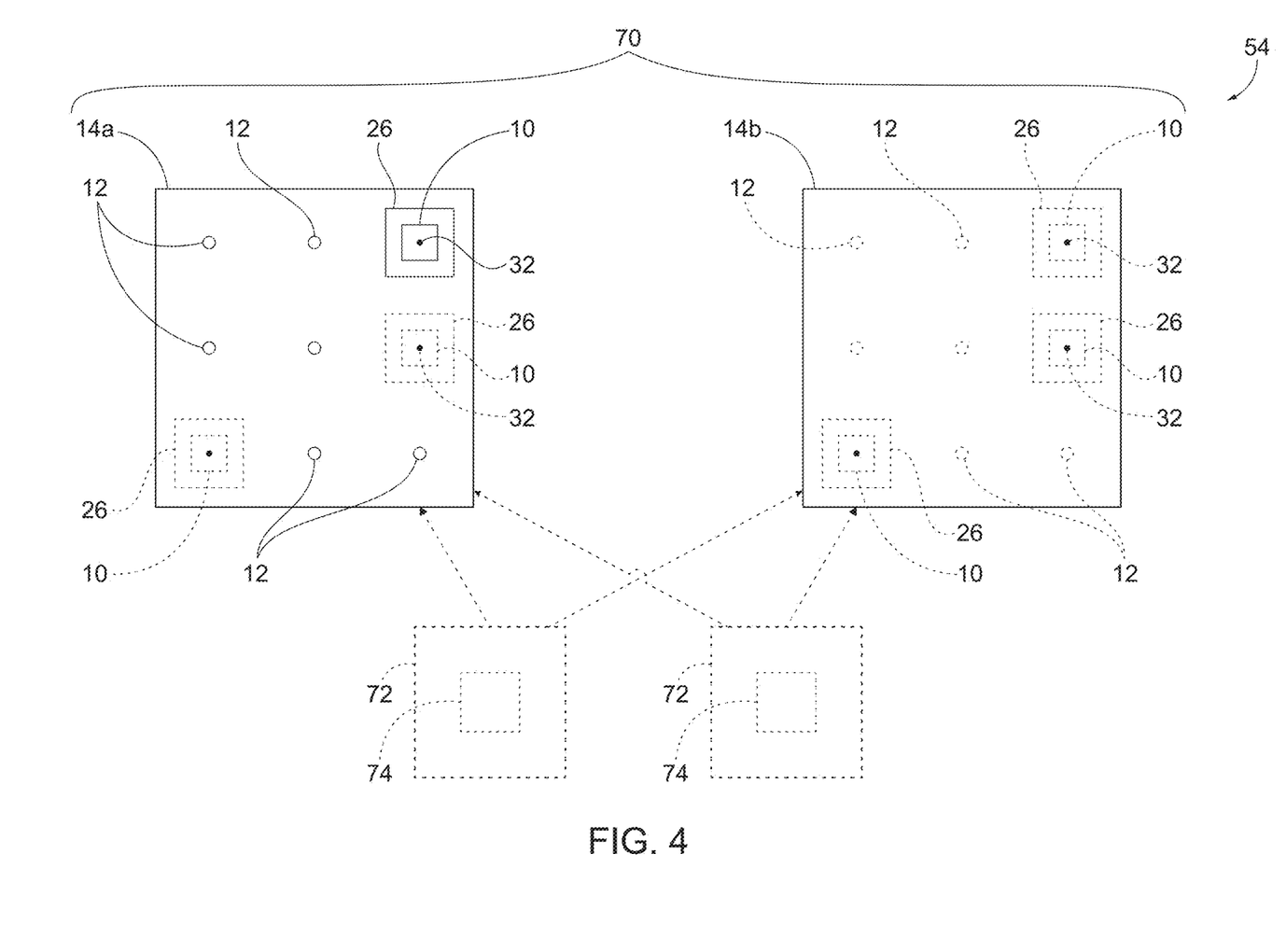
FIG. 4 is a schematic representation of examples of support systems that include one or more disclosed support tool indexes.

With reference to FIG. 1 and to the schematic representation of FIG. 4, disclosed adjustable support systems 54 for supporting at least one part (e.g., part 14) of an assembly structure 70 (e.g., an aircraft or other assembly structure having a plurality of parts and/or subassemblies assembled together) include an angularly adjustable indexing component (e.g., index component 18 of angularly adjustable support tool index 10) that is configured to move in at least two axes and/or has at least two degrees of freedom, a support fixture 26, and an installation pin 32. Support system 54 is adjustable to accommodate a surface of the at least one part of the assembly structure, a surface of a tool, or other surface. In this manner, disclosed support systems 54 may be configured to provide support for an individual part (e.g., part 14a and/or part 14b of FIG. 4) with indexing capability. For example, support system 54 may be configured to provide a nominal position of index component 18 while enabling pivotal adjustment of index component 18 for allowing for compensation for potential misalignment of mating features of the assembly structure. Support systems 54 may include the assembly structure 70 itself as well, and/or at least one part 14 of the assembly structure. In some examples, support system 54 includes a plurality of angularly adjustable support tool indexes 10. Each respective support tool index 10 may be positioned such that installation pin 32 is disposed through a different respective hole of at least one part within assembly structure 70.

Disclosed support tool indexes 10 may be used during determinant assembly operations for parts that are required to have support at an assembly-determined orientation. For example, as noted above, in determinant assembly operations, holes are pre-machined in the parts by the manufacturer, and disclosed support tool indexes 10 can aid in assembling a number of components that need to be aligned relative to each other without being too tight to get fasteners through the pre-machined holes. Further, disclosed support tool indexes 10 may be configured to position, support, and align mating parts or components to prevent fasteners from binding. Specifically, manufacturing variation in holes in parts may require slight angular adjustment of parts to be supported relative to other mating parts in order to enable determinant assembly of multiple parts without binding when installing fasteners through holes in the mating parts. Disclosed support tool indexes 10 also may be used whenever variation present in an assembly requires adjustable indexing to support the part through the assembly process, such as when trying to position a part relative to another part. For example, support tool indexes 10 may be configured to maintain support and provide a nominal condition while compensating for potential misalignment of mating features. The use of disclosed support tool indexes 10 in such operations may, in some examples, reduce tooling costs, enhance tool user experience, and/or permit nominal assembly precision.

In some examples, support system 54 includes one or more measuring apparatuses 72 configured to measure an angular difference between a current pivotally adjusted position of indexing face 20 of a respective support tool index 10 and the nominal position of indexing face 20. In such measuring apparatuses 72, two gaugeable features are set to a fixed tool feature containing a spherical bearing or other trapped ball and socket joint (e.g., ball and socket joint 24) that provides two-dimensional axial adjustment of an attached tool index to the as-assembled location of the part. These gaugeable features may be configured to establish the baseline index for a displacement indicator 74 to be used to calculate the resultant angle of the associated part feature. Measuring apparatus 72 may be configured to measure angular displacement of a part surface (e.g., side 44 or 46 of part 14), or a tooling feature attached to support tool index 10, or the tool itself (e.g., tool 16). The two gaugeable features are controlled tightly at the nominal condition, with one feature being the surface of the attachment tooling that does not move (e.g., support fixture 26) and the other feature being the surface of a feature, a part, a tool, etc., where if the latter surface moves, a measurement taken from surface of the attachment tooling would show the variation.

Figure 5:
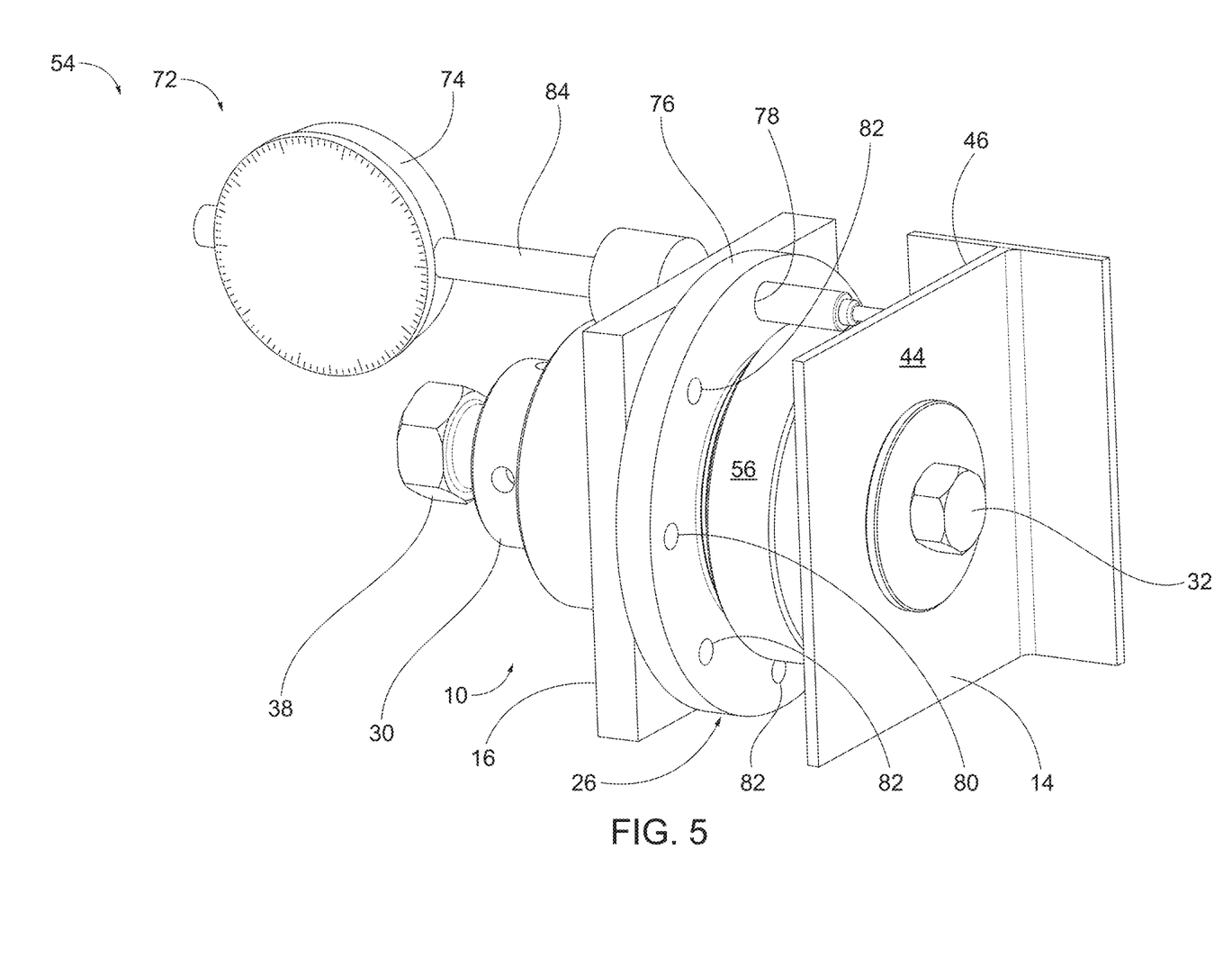
FIG. 5 is a perspective view of an example of a support system including a measuring apparatus according to the present disclosure.
Figure 6:
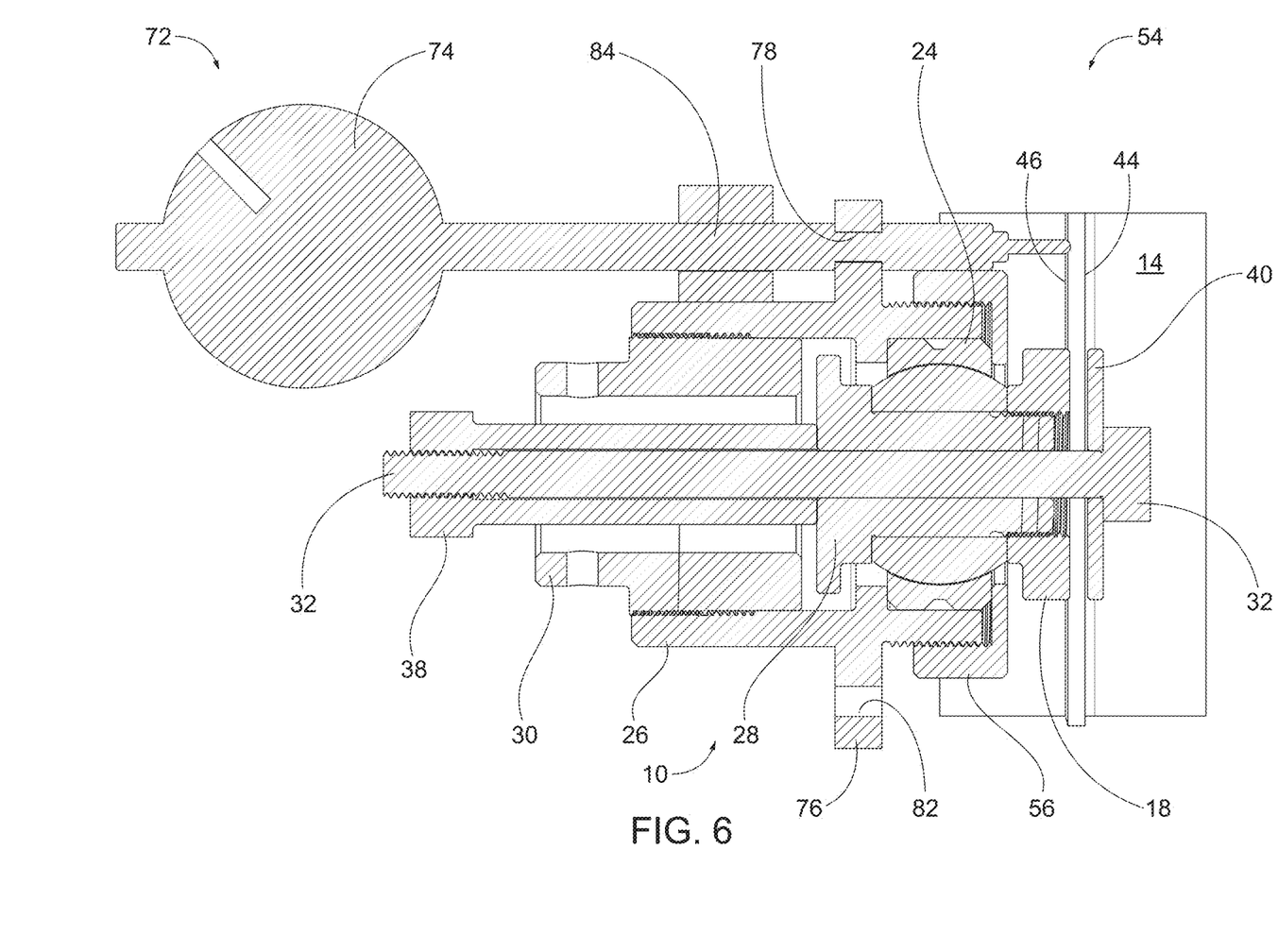
FIG. 6 is a cross-sectional view of an example of a support system including a measuring apparatus according to the present disclosure.

With reference to FIGS. 5-6, measuring apparatus 72 includes support fixture 26 and at least one displacement indicator 74. Support fixture 26 may include a datum flange 76, and angularly adjustable support tool index 10 is pivotally and/or axially adjustable relative to datum flange 76. At least a first hole 78 and a second hole 80 extend through datum flange 76, though datum flange 76 may include any number of additional holes extending therethrough (said additional holes indicated at 82, though any of holes 82 may serve as first hole 78 or second hole 80 as described herein). In use, a portion of displacement indicator 74 is positioned to extend through one of the holes of datum flange 76, and is shown through first hole 78 in FIGS. 5-6. In this arrangement, displacement indicator 74 (e.g., a longitudinal axis of a shaft 84, or elongate portion 84, of displacement indicator 74) is least substantially parallel to a nominal centerline of indexing face 20 of support tool index 10. Shaft 84 of displacement indicator 74 is generally orthogonal to datum flange 76 when shaft 84 is positioned through a hole of datum flange 76 (e.g., first hole 78, second hole 80, or any of the other holes 82).

When so positioned, displacement indicator 74 is configured to engage a surface (e.g., a surface of a part that is clamped against indexing face 20 of support tool index 10, such as second side 46 of part 14 as shown in the example of FIGS. 5-6), such that displacement indicator 74 is configured to measure a first pivotal displacement of the surface relative to a nominal position of part 14. Then, displacement indicator 74 may be removed from first hole 78, and the portion of displacement indicator 74 may be positioned to extend through second hole 80 of datum flange 76 such that displacement indicator 74 again is at least substantially parallel to the nominal centerline of indexing face 20. In position through second hole 80, displacement indicator 74 is configured to engage the surface (e.g., side 46 of part 14) at a different location than when displacement indicator 74 was inserted through first hole 78. Then, displacement indicator 74 may be used to measure a second pivotal displacement of the surface relative to the nominal position of part 14 at the location corresponding to second hole 80. The measured first and second pivotal displacements can be used to enable determination of an axial orientation of indexing face 20 relative to the nominal position of part 14. In some examples, displacement measurements may be taken through different and/or additional holes 82 of datum flange 76 to measure pivotal displacement of part 14 at different locations.

In some examples, displacement indicator 74 directly contacts, or engages, a surface of a part (e.g., side 46 of part 14) that is clamped against indexing face 20 of support tool index 10. In some examples, displacement indicator 74 may be configured to engage a surface of a tooling feature (e.g., tool 16) attached to the index component 18. Additionally or alternatively, displacement indicator 74 may be configured to engage a surface of index component 18.

In some support systems 54, displacement indicator 74 may be moved to a different respective hole of datum flange 76 for each respective displacement measurement. Some support systems 54 may include two or more displacement indicators 74, with each respective displacement indicator 74 being positioned through a different respective hole of datum flange 76 to measure displacement at a different respective location of the surface clamped to support tool index 10. When determining placement of holes in datum flange 76 for taking displacement measurements, first hole 78 and second hole 80 are generally at least substantially equidistant from a longitudinal axis of installation pin 32 clamping part 14 to the index component 18. In other words, first hole 78 and second hole 80 are located equidistantly from the pivotal axis of support tool index 10 and have a nominal tooling index with a feature that is perpendicular to the pivotal axis to measure with respect to. Additionally, first hole 78 and second hole 80 may be positioned at substantially 90 degrees relative to one another and relative to installation pin 32. With the known information about the relative positions of first hole 78 and second hole 80, and the readings from displacement indicator 74 and each location corresponding to first hole 78 and second hole 80, the resultant angle of the part is off from the nominal position may be determined, such as by being calculated with the Parallelogram Law of Vectors, or the displacement readings may be inserted into a 3D CAD program to determine the resultant angle of displacement.

Displacement indicators 74 may be any suitable type of indicator, with non-exclusive examples including dial indicators, micrometers, calipers, angle gages, gage blocks/shims, machinist scales, digital indicators, and/or visible tick marks and an arrow.

Disclosed measuring apparatuses 72 can be used to determine the amount of angular adjustment of a part to be supported, relative to other mating parts, where there may be a threshold level of adjustment that is desired. Where a number of parts are positioned relative to each other and supported by a number of indexable components, and there is measured amount of angular adjustment for a given part that exceeds the threshold, such a measured adjustment amount may be indicative of level of manufacturing variation of the surface or hole dimension of a part, which could be indicative of a suspect out-of-tolerance part and help in understanding if the variation is acceptable for the parts that are to be installed on the assembly. Thus, disclosed measuring apparatuses 72 may be configured to find issues with a part (e.g., a bad or non-compliant part), and/or narrow down area of where the issue is stemming from. Measuring apparatus 72 can therefore be configured to serve as a material means of determining quality of a part or product without expensive invasive devices and specialized personnel needed to complete work. Measuring apparatus 72 additionally or alternatively may be used to validate and/or certify that parts are within a prescribed tolerance, and/or to understand whether/what variation is acceptable. In a particular example, measuring apparatus 72 may be used once on every ship set for a product to validate it before moving on to next part of assembly. Support tool index 10 and measuring apparatus 72 may be used on any determinant assembly tools that allow for axial adjustability of its tooling indexes about two axes. Additionally or alternatively, support tool indexes 10 and measuring apparatuses 72 may create cost savings by ensuring first time quality, reduce touch labor, improve product manufacturing time, and/or improve product quality.

Figure 7:
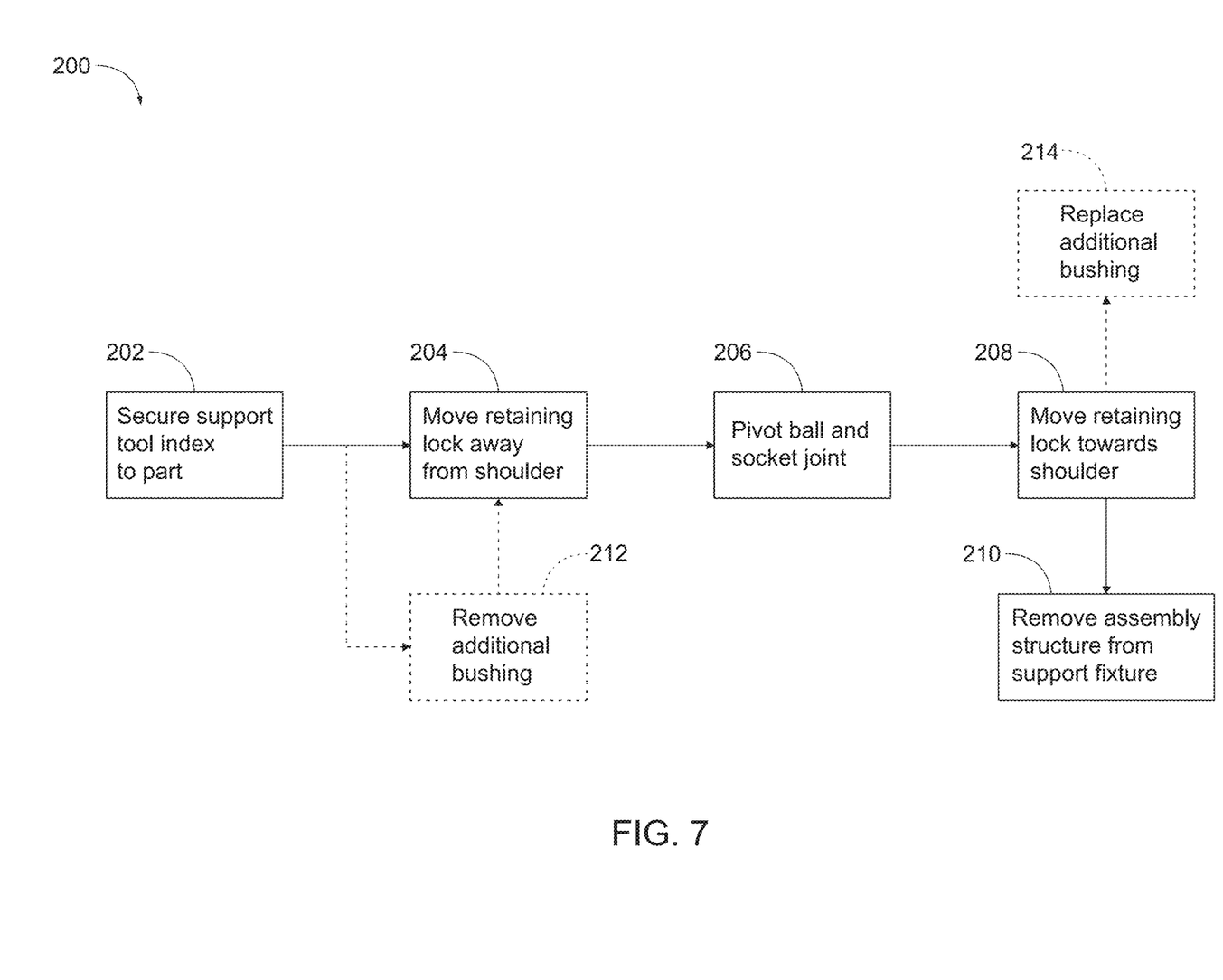
FIG. 7 is a schematic flowchart diagram illustrating methods of operating disclosed support tool indexes.
Figure 8:
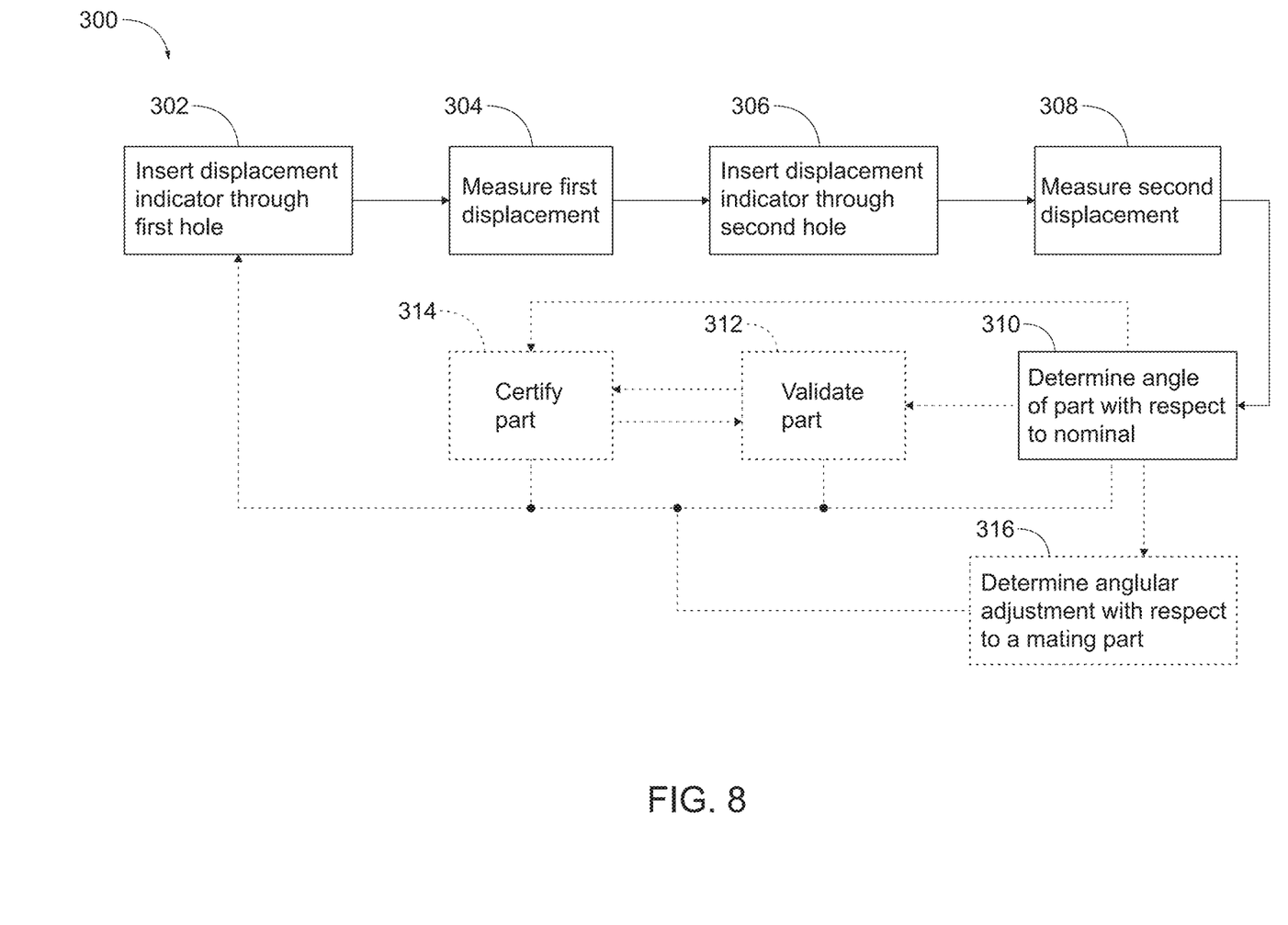
FIG. 8 is a schematic flowchart diagram illustrating methods of measuring pivotal displacement of a surface using measuring apparatus, according to the present disclosure.

FIGS. 7-8 schematically provide flowcharts that represent illustrative, non-exclusive examples of methods according to the present disclosure. In FIGS. 7-8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 7-8 are not limiting and other methods and steps are within the scope of the present disclosure, including methods having greater than or fewer than the number of steps illustrated, as understood from the discussions herein.

In methods 200 shown in FIG. 7, an angularly adjustable support tool index (e.g., support tool index 10, though methods 200 are not limited to the same) may be secured to at least one part of an assembly structure (or to another surface), at 202. A retaining lock (e.g., retaining lock 30) may be moved away from a shoulder of a bushing (e.g., shoulder 48 of bushing 28) at 204, thereby allowing a trapped ball and socket joint (e.g., ball and socket joint 24) and an indexing face (e.g., indexing face 20) to be pivoted with respect to a support fixture (e.g., support fixture 26) supporting the at least one part of the assembly structure, at 206. For example, moving the retaining lock away from the shoulder of the bushing at 204 may include translating the retaining lock away from the shoulder until the retaining lock is spaced apart from the shoulder enough to allow pivoting of the ball and socket joint and the bushing attached thereto (e.g., bushing 28). In some methods 200, moving the retaining lock away from the shoulder of the bushing at 204 includes rotating the retaining lock with respect to the support fixture via a threaded engagement between the retaining lock and the support fixture. Methods 200 also may include removing an additional bushing (e.g., additional bushing 90) from between the retaining lock and the retainer for the installation pin of the support tool index, at 212.

The ball and socket joint may be pivoted with respect to the support fixture at 206 until the indexing face of an index component (e.g., index component 18) is parallel to the part surface or other surface to which the support tool index is clamped. Put another way, the indexing face may be pivoted to a pivoted orientation at 206, via movement of the ball and socket joint. Then, the retaining lock may be moved towards the shoulder of the bushing at 208 until the retaining lock contacts the shoulder and either locks a current position (e.g., pivoted orientation) of the indexing face of the angularly adjustable support tool index relative to the support fixture, or returns the indexing face to its nominal position, depending on the features of the support tool index being used. In some examples, the additional bushing may be replaced at 214 back into its position between the retaining lock and the retainer for the installation pin, thereby returning the indexing face to its nominal position. Methods 200 also may include removing a completed assembly structure from the support fixture once the build is complete, at 210.

In methods 300 shown in FIG. 8, a portion of a displacement indicator (e.g., displacement indicator 74) may be inserted through a first hole in a datum flange of a support fixture (e.g., first hole 78 of datum flange 76) at 302. The support fixture is generally supporting a part clamped to an indexing face of an angularly adjustable indexing component (e.g., indexing face 20 of index component 18), and the displacement indicator is inserted through the first hole such that the displacement indicator contacts the part at a first location. A first pivotal displacement of the part relative to a nominal position of the part is measured at the first location using the displacement indicator at 304. Then, part of the displacement indicator may be inserted through a second hole in the datum flange (e.g., second hole 80) of the support fixture at 306 such that the displacement indicator contacts the part at a second location. A second pivotal displacement of part relative to a nominal position of the part is measured at the second location using the displacement indicator at 308. In methods 300, the first hole and the second hole are at least substantially equidistant from a longitudinal axis of an installation pin (e.g., installation pin 32) clamping the part to the angularly adjustable indexing component. Further, the first hole and the second hole are positioned at 90 degrees relative to one another. Then, a resultant angle that the part is off from the nominal position may be determined at 310, using the first measured displacement and the second measure displacement, along with known information about the angle between the first hole and the second hole. In some examples, determining the resultant angle that the part is off from the nominal position at 310 includes determining an angular variation of the installation pin relative to a nominal z-axis. Additionally or alternatively, determining the resultant angle that the part is off from the nominal position at 310 may include determining a magnitude of variation of the part from the nominal position of the part.

Methods 300 may include validating that the part is within prescribed tolerances, at 312. For example, validating the part at 312 may include comparing measured displacements and resulting displacement angles with prescribed tolerances to determine whether or not the part is within the prescribed tolerances, and then validating the part if the angular displacement is within the prescribed tolerance. Similarly, methods 300 may include certifying that the part is within a given angular variation range that meets acceptability requirements for certification, at 314. Additionally or alternatively, methods 300 may include determining an amount of angular adjustment of the part supported by the support fixture relative to at least one other mating part at 316, and comparing the amount of angular adjustment of the part to a predetermined threshold level of acceptable angular adjustment. The steps of method 300 may be repeated a plurality of times at a plurality of different locations of the part.

Illustrative, non-exclusive examples of inventive subject matter according to the present disclosure are described in the following enumerated paragraphs:

A1. An angularly adjustable support tool index (10) for aligning a tool (16) relative to a hole (12) of a part (14), the angularly adjustable support tool index (10) comprising:
  an index component (18) comprising an indexing face (20) positioned against the part (14);
  a trapped ball and socket joint (24) configured to allow pivotal adjustment and/or axial adjustment of the index component (18) with respect to a support fixture (26), wherein the support fixture (26) is configured to adjust the index component (18) to align with and support the part (14);
  a bushing (28) coupling the index component (18) to the trapped ball and socket joint (24); and
  a retaining lock (30) configured to secure the bushing (28) in place with respect to the support fixture (26), wherein the retaining lock (30) is configured to lock the trapped ball and socket joint (24) from movement and maintain a set position of the index component (18) when the retaining lock (30) is engaged with the bushing (28), and wherein the retaining lock (30) is configured to be selectively translated away from the bushing (28) to allow adjustment of the index component (18) with respect to the support fixture (26).

A1.1. The angularly adjustable support tool index (10) of paragraph A1, wherein the index component (18) is annular.

A1.2. The angularly adjustable support tool index (10) of paragraph A1 or A1.1, wherein the trapped ball and socket joint (24) comprises a spherical bearing.

A2. The angularly adjustable support tool index (10) of any of paragraphs A1-A1.2, wherein the angularly adjustable support tool index (10) is configured to receive an installation pin (32) through a through-hole (34) extending through the index component (18), the trapped ball and socket joint (24), and the bushing (28), wherein the installation pin (320 is configured to extend through the hole (12) in the part (14) to secure the part (14) against the indexing face (20), and wherein an end (36) of the installation pin (32) is secured by a retainer (38).

A3. The angularly adjustable support tool index (10) of any of paragraphs A1-A2, wherein the retaining lock (30) is configured to engage a shoulder (48) of the bushing (28).

A4. The angularly adjustable support tool index (10) of paragraph A3, wherein the shoulder (48) of the bushing (28) faces away from the indexing face (20) of the index component (18).

A5. The angularly adjustable support tool index (10) of paragraph A3 or A4, wherein the index component (18) engages a first end (50) of the bushing (28) that is opposite from the shoulder (48) of the bushing (28).

A6. The angularly adjustable support tool index (10) of any of paragraphs A1-A5, wherein the indexing face (20) is configured to be clamped against the part (14).

A7. The angularly adjustable support tool index (10) of any of paragraphs A1-A6, wherein the trapped ball and socket joint (24) is configured to allow pivotal adjustment and/or axial adjustment of the index component (18) at its centerline to maintain co-axial alignment between the index component (18) and a centerline of the hole (12) through the part (14).

A8. The angularly adjustable support tool index (10) of any of paragraphs A1-A7, wherein the bushing (28) comprises a/the shoulder (48).

A9. The angularly adjustable support tool index (10) of any of paragraphs A1-A8, wherein a/the first end (50) of the bushing (28) extends through the index component (18).

A10. The angularly adjustable support tool index (10) of any of paragraphs A1-A9, wherein a/the shoulder (48) of the bushing (28) is spherical and/or curved.

A10.1. The angularly adjustable support tool index (10) of paragraph A10, wherein the shoulder (48) of the bushing (28) has a radial center concentric with the center of the trapped ball and socket joint (24).

A10.2. The angularly adjustable support tool index (10) of paragraph A10 or A10.1, wherein the shoulder (48) of the bushing (28) has a spherical face.

A11. The angularly adjustable support tool index (10) of any of paragraphs A1-A10.2, wherein a/the shoulder (48) of the bushing (28) is square, straight, and/or at least substantially parallel to the indexing face (20) of the index component (18).

A12. The angularly adjustable support tool index (10) of any of paragraphs A1-A11, wherein the angularly adjustable support tool index (10) is configured to lock the indexing face (20) in a nominal position.

A13. The angularly adjustable support tool index (10) of any of paragraphs A1-A12, wherein the angularly adjustable support tool index (10) is configured to lock the indexing face (20) in a plurality of different pivotally adjusted positions.

A14. The angularly adjustable support tool index (10) of any of paragraphs A1-A13, wherein the bushing (28), the trapped ball and socket joint (24), and the index component (18) are inseparable from one another without damaging or destroying the angularly adjustable support tool index (10).

A15. The angularly adjustable support tool index (10) of any of paragraphs A1-A14, wherein the bushing (28), the trapped ball and socket joint (24), and the index component (18) are integrally formed together.

A16. The angularly adjustable support tool index (10) of any of paragraphs A1-A15, wherein the bushing (28), the trapped ball and socket joint (24), and the index component (18) are monolithic.

A17. The angularly adjustable support tool index (10) of any of paragraphs A1-A16, further comprising an additional bushing (90) positioned between the retaining lock (30) and a/the retainer (38) for a/the installation pin (32).

B1. An adjustable support system (54) configured to support at least one part (14) of an assembly structure (70), the adjustable support system (54) comprising:
  a support fixture (26);
  the angularly adjustable support tool index (10) of any of paragraphs A1-A17, wherein the index component (18) of the angularly adjustable support tool index (10) is coupled to the support fixture (26) via a bearing housing (56) surrounding the trapped ball and socket joint (24) of the angularly adjustable support tool index (10); and
  an/the installation pin (32), wherein the installation pin (32) is disposed through a hole of the at least one part (14) of the assembly structure (70), and wherein the installation pin (32) is received within a/the through-hole (34) extending through the index component (18), the trapped ball and socket joint (24), and the bushing (28) of the angularly adjustable support tool index (10), wherein the adjustable support system (54) is adjustable to accommodate a surface of the at least one part (14) of the assembly structure (70).

B2. The adjustable support system (54) of paragraph B1, wherein an outer surface (58) of the retaining lock (30) of the angularly adjustable support tool index (10) has a threaded engagement with an inner surface (60) of the support fixture (26).

B3. The adjustable support system (54) of any of paragraphs B1-B2, wherein the retaining lock (30) is selectively translatable within the support fixture (26), and wherein when the retaining lock (30) is spaced apart from a/the shoulder (48) of the bushing (28), the trapped ball and socket joint (24) of the angularly adjustable support tool index (10) is able to pivot with respect to the support fixture (26).

B4. The adjustable support system (54) of any of paragraphs B1-B3, wherein a shoulder-facing surface (62) of the retaining lock (30) engages with a/the shoulder (48) of the bushing (28) when the angularly adjustable support tool index (10) is locked with respect to the support fixture (26).

B5. The adjustable support system (54) of paragraph B4, wherein the shoulder-facing surface (62) of the retaining lock (30) has a complementary curve to that of the shoulder (48) of the bushing (28), such that the shoulder-facing surface (62) of the retaining lock (30) and the shoulder (48) of the bushing (28) nest together when the retaining lock (30) is engaged with the bushing (28) to lock the angularly adjustable support tool index (10) in position with respect to the support fixture (26).

B6. The adjustable support system (54) of paragraph B4 or B5, wherein one of the shoulder-facing surface (62) of the retaining lock (30) and the shoulder (48) of the bushing (28) is concave, and wherein the other of the shoulder-facing surface (62) of the retaining lock (30) and the shoulder (48) of the bushing (28) is convex.

B7. The adjustable support system (54) of any of paragraphs B4-B6, wherein the shoulder (48) of the bushing (28) has a curved surface that shares a radial center point with that of the trapped ball and socket joint (24).

B8. The adjustable support system (54) of any of paragraphs B1-B7, further comprising a threaded retainer (38)

configured to engage an/the end (36) of the installation pin (32) to lock the at least one part (14) in place against the index component (18), wherein the installation pin (32) extends through the threaded retainer (38).

B9. The adjustable support system (54) of paragraph B8, wherein the threaded retainer (38) engages the bushing (28) opposite the index component (18).

B10. The adjustable support system (54) of paragraph B8 or B9, wherein the threaded retainer (38) is configured to engage threads (68) on the end (36) of the installation pin (32).

B11. The adjustable support system (54) of any of paragraphs B8-B10, wherein the threaded retainer (38) is coupled to the installation pin (32) such that installation pin (32) clamps the at least one part (14) to the index component (18), and wherein the trapped ball and socket joint (24) is configured to allow adjustment of an angle of clamping.

B12. The adjustable support system (54) of any of paragraphs B1-B11, wherein the bearing housing (56) comprises a bearing outer ring surrounding the trapped ball and socket joint (24) and coupled to the support fixture (26).

B13. The adjustable support system (54) of paragraph B12, wherein the bearing outer ring is configured to contain the ball and socket joint (24) and couple the ball and socket joint (24) to the support fixture (26).

B14. The adjustable support system (54) of any of paragraphs B1-B13, wherein the adjustable support system (54) is configured to maintain support for the at least one part (14), and wherein the adjustable support system (54) is further configured to provide a nominal position of the index component (18) while enabling pivotal adjustment of the index component (18) for allowing for potential misalignment of mating features of the assembly structure (70).

B15. The adjustable support system (54) of any of paragraphs B1-B14, further comprising the at least one part (14) of the assembly structure (70).

B16. The adjustable support system (54) of any of paragraphs B1-B15, further comprising the assembly structure (70).

B17. The adjustable support system (54) of any of paragraphs B1-B16, wherein the at least one part (14) of the assembly structure (70) is clamped between the indexing face (20) of the angularly adjustable support tool index (10) and a washer (40).

B18. The adjustable support system (54) of any of paragraphs B1-B17, comprising a plurality of angularly adjustable support tool indexes (10), wherein each respective angularly adjustable support tool index (10) of the plurality of angularly adjustable support tool indexes (10) is positioned such that the installation pin (32) is disposed through a different respective hole of the at least one part (14) within the assembly structure (70).

B19. The adjustable support system (54) of any of paragraphs B1-B18, further comprising a measuring apparatus (72) configured to measure an angular difference between a current pivotally adjusted position of the indexing face (20) and a/the nominal position of the indexing face (20).

B20. The adjustable support system (54) of paragraph B19, wherein the measuring apparatus (72) is the measuring apparatus (72) of any of paragraphs C1-C5.

C1. A measuring apparatus (72) for measuring an angularly adjustable indexing component, the measuring apparatus (72) comprising:

a support fixture (26) having a datum flange (76), wherein an indexing face (20) of the angularly adjustable indexing component is axially adjustable relative to the datum flange (76), and wherein the datum flange (76) comprises at least a first hole (78) and second hole (80) extending therethrough;

at least one displacement indicator (74), wherein a portion of the at least one displacement indicator (74) is configured to be positioned to extend through the first hole (78) of the datum flange (76) such that the at least one displacement indicator (74) is at least substantially parallel to a nominal centerline of the indexing face (20), wherein the at least one displacement indicator (74) is configured to engage a surface that is clamped against the indexing face (20) when the displacement indicator (74) extends through the first hole (78) in the datum flange (76), such that the at least one displacement indicator (74) is configured to measure a first pivotal displacement of the surface relative to a nominal position of a part (14), wherein the portion of the at least one displacement indicator (74) is further configured to be positioned to extend through the second hole (80) of the datum flange (76) such that the at least one displacement indicator (74) is at least substantially parallel to the nominal centerline of the indexing face (20), wherein the at least one displacement indicator (74) is configured to engage the surface when the at least one displacement indicator (74) extends through the second hole (80) in the datum flange (76), such that the at least one displacement indicator (74) is configured to measure a second pivotal displacement of the surface relative to the nominal position of the part (14), and wherein the measured first and second pivotal displacements enable determination of an axial orientation of the indexing face (20) relative to the nominal position of the part (14).

C1.1. The measuring apparatus (72) of paragraph C1, wherein the surface the at least one displacement indicator (74) is configured to engage is a surface of the part (14), wherein the part (14) is clamped against the indexing face (20) when the at least one displacement indicator (74) extends through the first hole (78) in the datum flange (76).

C1.2. The measuring apparatus (72) of paragraph C1, wherein the surface the at least one displacement indicator (74) is configured to engage is a surface of a tooling feature attached to the angularly adjustable indexing component.

C1.3. The measuring apparatus (72) of paragraph C1, wherein the surface the at least one displacement indicator (74) is configured to engage is a surface of the angularly adjustable indexing component.

C2. The measuring apparatus (72) of any of paragraphs C1-C1.3, wherein the at least one displacement indicator (74) comprises a first displacement indicator extending through the first hole (78) of the datum flange (76) and engaged with the part (14), and wherein the at least one displacement indicator (74) comprises a second displacement indicator extending through the second hole (80) of the datum flange (76) and engaged with the part (14).

C3. The measuring apparatus (72) of any of paragraphs C1-C2, wherein the first hole (78) and the second hole (80) are at least substantially equidistant from a longitudinal axis of an installation pin (32) clamping the part (14) to the angularly adjustable indexing component.

C4. The measuring apparatus (72) of any of paragraphs C1-C3, wherein the first hole (78) and the second hole (80) are positioned at 90 degrees relative to one another and relative to the installation pin (32).

C5. The measuring apparatus (72) of any of paragraphs C1-C4, wherein the at least one displacement indicator (74) comprises a dial indicator, a micrometer, calipers, an angle gage, a gage block/shim, a machinist scale, a digital indicators, and/or visible tick marks and an arrow.

D1. A system (54), comprising:
the measuring apparatus (72) of any of paragraphs C1-C5; and the angularly adjustable indexing component.

D2. The system of paragraph D1, wherein the angularly adjustable indexing component comprises the angularly adjustable support tool index (10) of any of paragraphs A1-A17.

D3. The system of any of paragraphs D1-D2, wherein the angularly adjustable indexing component comprises a spherical bearing.

D4. The system of any of paragraphs D1-D2, wherein the angularly adjustable indexing component comprises a trapped ball and socket joint (24).

D5. The system of any of paragraphs D1-D4, wherein the angularly adjustable indexing component is configured to move in at least two axes and/or has at least two degrees of freedom.

E1. A method (200), comprising:
securing (202) the angularly adjustable support tool index (10) of any of paragraphs A1-A17 to at least one part (14) of an assembly structure (70);
moving (204) the retaining lock (30) away from a/the shoulder (48) of the bushing (28), thereby allowing the trapped ball and socket joint (24) to pivot with respect to the support fixture (26) supporting the at least one part (14) of the assembly structure (70).

E2. The method (200) of paragraph E1, further comprising moving (208) the retaining lock (30) towards the shoulder (48) of the bushing (28) until the retaining lock (30) contacts the shoulder (48) and locks a current position of the indexing face (20) of the angularly adjustable support tool index (10) relative to the support fixture (26).

E3. The method (200) of paragraph E1 or E2, further comprising removing (210) a completed assembly structure (70) from the support fixture (26) once the build is complete.

E4. The method (200) of any of paragraphs E1-E3, further comprising:
removing (212) a/the additional bushing (90) from between the retaining lock (30) and a/the retainer (38) for a/the installation pin (32);
pivoting (206) the indexing face (20) of the angularly adjustable support tool index (10) to a pivoted orientation, wherein the removing (212) the additional bushing (90) is performed before the pivoting (206) the indexing face (20); and
locking (208) the indexing face (20) in the pivoted orientation by re-engaging the retaining lock (30) with the shoulder (48) of the bushing (28).

E5. The method (200) of paragraph E4, further comprising inserting (214) the additional bushing (90) back into the angularly adjustable support tool index (10) between the retaining lock (30) and the retainer (38) for the installation pin (32), thereby returning the indexing face (20) to a nominal orientation.

F1. A method (300), comprising:
Inserting (302) part of a displacement indicator (74) through a first hole (78) in a datum flange (76) of a support fixture (26) supporting a part (14) clamped to an indexing face (20) of an angularly adjustable indexing component such that the displacement indicator (74) contacts the part (14);
measuring (304) a first pivotal displacement of the part (14) relative to a nominal position of the part (14), using the displacement indicator (74);
inserting (306) part of the displacement indicator (74) through a second hole (80) in the datum flange (76) such that the displacement indicator (74) contacts the part (14) again, wherein the first hole (78) and the second hole (80) are at least substantially equidistant from a longitudinal axis of an installation pin (32) clamping the part (14) to the angularly adjustable indexing component, and wherein the first hole (78) and the second hole (80) are positioned at 90 degrees relative to one another;
measuring (308) a second pivotal displacement of the part (14) relative to the nominal position of the part (14), using the displacement indicator (74); and
determining (310) a resultant angle that the part (14) is off from the nominal position.

F2. The method (300) of paragraph F1, wherein the determining (310) the resultant angle that the part (14) is off from the nominal position comprises determining an angular variation of the installation pin (320 relative to a nominal z-axis.

F3. The method (300) of any of paragraphs F1-F2, further comprising determining a magnitude of variation of the part (14) from the nominal position of the part (14).

F4. The method (300) of any of paragraphs F1-F3, further comprising repeating all the steps of paragraph F1 at a plurality of different locations of the part (14).

F5. The method (300) of any of paragraphs F1-F4, further comprising validating (312) that the part (14) is within prescribed tolerances.

F6. The method (300) of any of paragraphs F1-F5, further comprising certifying (314) that the part (14) is within a given angular variation range that meets acceptability requirements for certification.

F7. The method (300) of any of paragraphs F1-F6, further comprising:
determining (316) an amount of angular adjustment of the part (14) supported by the support fixture (26) relative to at least one other mating part; and
comparing the amount of angular adjustment of the part (140 to a predetermined threshold level of acceptable angular adjustment.

G1. The use of the angularly adjustable support tool index (10) of any of paragraphs A1-A17 to determine angular displacement of a part (14) relative to a nominal position of the part (14).

G2. The use of the adjustable support system (54) of any of paragraphs B1-B20 to determine angular displacement of a part (14) relative to a nominal position of the part (14).

G3. The use of the measuring apparatus (72) of any of paragraphs C1-C5 to determine angular displacement of a part (14) relative to a nominal position of the part (14).

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. An angularly adjustable support tool index for aligning a tool relative to a hole of a part, the angularly adjustable support tool index comprising:
    an index component comprising an indexing face positioned against the part;
    a trapped ball and socket joint configured to allow pivotal adjustment of the index component with respect to a support fixture, wherein the support fixture is configured to adjust the index component to align with and support the part;
    a bushing coupling the index component to the trapped ball and socket joint; and
    a retaining lock configured to secure the bushing in place with respect to the support fixture, wherein the retaining lock is configured to lock the trapped ball and socket joint from movement and maintain a set position of the index component when the retaining lock is engaged with a shoulder of the bushing, and wherein the retaining lock is configured to be selectively translated away from the shoulder of the bushing to allow adjustment of the index component with respect to the support fixture.

2. The angularly adjustable support tool index according to claim 1, wherein the angularly adjustable support tool index is configured to receive an installation pin through a through-hole extending through the index component, the trapped ball and socket joint, and the bushing, wherein the installation pin is configured to extend through the hole in the part to secure the part against the indexing face, and wherein an end of the installation pin is secured by a retainer.

3. The angularly adjustable support tool index according to claim 1, wherein the shoulder of the bushing faces away from the indexing face of the index component.

4. The angularly adjustable support tool index according to claim 1, wherein the shoulder of the bushing is curved and has a radial center concentric with the center of the trapped ball and socket joint.

5. The angularly adjustable support tool index according to claim 1, wherein the shoulder of the bushing is at least substantially parallel to the indexing face of the index component.

6. The angularly adjustable support tool index according to claim 1, wherein the angularly adjustable support tool index is configured to lock the indexing face in a nominal position, and wherein the angularly adjustable support tool index is further configured to lock the indexing face in a plurality of different pivotally adjusted positions.

7. The angularly adjustable support tool index according to claim 1, wherein the bushing, the trapped ball and socket joint, and the index component are inseparable from one another without damaging or destroying the angularly adjustable support tool index.

8. An adjustable support system configured to support at least one part of an assembly structure, the adjustable support system comprising:
a support fixture;
the angularly adjustable support tool index according to claim 1, wherein the index component of the angularly adjustable support tool index is coupled to the support fixture via a bearing housing surrounding the trapped ball and socket joint of the angularly adjustable support tool index; and
an installation pin, wherein the installation pin is disposed through a hole of the at least one part of the assembly structure, and wherein the installation pin is received within a through-hole extending through the index component, the trapped ball and socket joint, and the bushing of the angularly adjustable support tool index, wherein the adjustable support system is configured to maintain support for the at least one part, and wherein the adjustable support system is further configured to provide a nominal position of the index component while enabling pivotal adjustment of the index component for allowing for potential misalignment of mating features of the assembly structure.

9. The adjustable support system according to claim 8, wherein an outer surface of the retaining lock of the angularly adjustable support tool index has a threaded engagement with an inner surface of the support fixture.

10. The adjustable support system according to claim 8, wherein the retaining lock is selectively translatable within the support fixture, and wherein when the retaining lock is spaced apart from the shoulder of the bushing, the trapped ball and socket joint of the angularly adjustable support tool index is able to pivot with respect to the support fixture.

11. The adjustable support system according to claim 8, wherein a shoulder-facing surface of the retaining lock engages with the shoulder of the bushing when the angularly adjustable support tool index is locked with respect to the support fixture.

12. The adjustable support system according to claim 11, wherein the shoulder-facing surface of the retaining lock has a complementary curve to that of the shoulder of the bushing, such that the shoulder-facing surface of the retaining lock and the shoulder of the bushing nest together when the retaining lock is engaged with the bushing to lock the angularly adjustable support tool index in position with respect to the support fixture.

13. The adjustable support system according to claim 12, wherein the shoulder of the bushing has a curved surface that shares a radial center point with that of the trapped ball and socket joint.

14. The adjustable support system according to claim 8, further comprising a threaded retainer configured to engage an end of the installation pin to lock the at least one part in place against the index component, wherein the installation pin extends through the threaded retainer, wherein the threaded retainer engages the bushing opposite the index component, and wherein the threaded retainer is configured to engage threads on the end of the installation pin.

15. The adjustable support system according to claim 14, wherein the threaded retainer is coupled to the installation pin such that installation pin clamps the at least one part to the index component, and wherein the trapped ball and socket joint is configured to allow adjustment of an angle of clamping.

16. The adjustable support system according to claim 8, wherein the bearing housing comprises a bearing outer ring surrounding the trapped ball and socket joint and coupled to the support fixture.

17. The adjustable support system according to claim 8, comprising a plurality of angularly adjustable support tool indexes, wherein each respective angularly adjustable support tool index of the plurality of angularly adjustable support tool indexes is positioned such that the installation pin is disposed through a different respective hole of the at least one part within the assembly structure.

18. The adjustable support system according to claim 8, further comprising a measuring apparatus configured to measure an angular difference between a current pivotally adjusted position of the indexing face and a nominal position of the indexing face.

\* \* \* \* \*